United States Patent
Giebel

(10) Patent No.: US 7,293,120 B2
(45) Date of Patent: Nov. 6, 2007

(54) DMA MODULE HAVING PLURALITY OF FIRST ADDRESSABLE LOCATIONS AND DETERMINING IF FIRST ADDRESSABLE LOCATIONS ARE ASSOCIATED WITH ORIGINATING DMA PROCESS

(75) Inventor: Burkhard Giebel, Denzlingen (DE)

(73) Assignee: Micronas GmbH, Freiburg (DE)

( * ) Notice: Subject to any disclaimer, the term of this patent is extended or adjusted under 35 U.S.C. 154(b) by 294 days.

(21) Appl. No.: 10/751,668

(22) Filed: Jan. 5, 2004

(65) Prior Publication Data

US 2004/0186932 A1  Sep. 23, 2004

(30) Foreign Application Priority Data

Jan. 3, 2003  (DE) .................. 103 00 030

(51) Int. Cl.
*G06F 13/00*  (2006.01)
*G06F 13/28*  (2006.01)

(52) U.S. Cl. .................. 710/22; 370/364; 710/23; 710/26; 712/244

(58) Field of Classification Search .................. 710/22, 710/23, 26; 370/364; 712/244
See application file for complete search history.

(56) References Cited

U.S. PATENT DOCUMENTS

| | | | |
|---|---|---|---|
| 5,367,639 A | 11/1994 | Sodos | 395/275 |
| 5,416,916 A | 5/1995 | Bayle | 710/22 |
| 5,828,903 A | 10/1998 | Sethuram et al. | 395/817 |
| 6,032,204 A | 2/2000 | Huff et al. | 710/23 |
| 6,324,599 B1 | 11/2001 | Zhou et al. | 710/26 |
| 6,674,751 B1 * | 1/2004 | Dittmar | 370/364 |
| 6,799,269 B2 * | 9/2004 | Dowling | 712/244 |

* cited by examiner

*Primary Examiner*—Tammara Peyton
(74) *Attorney, Agent, or Firm*—O'Shea, Getz & Kosakowski, P.C.

(57) ABSTRACT

A DMA module includes an address generator to perform a write or read access to a location of an addressable memory, and an address counter to advance a stored address to an adjacent memory location. The address counter does not act on an internal register of the DMA module but instead is configured so that between reading an address value from the memory and writing the address value to the memory, the address counter is advanced once. The memory location at which the address value is read or written takes on the function of a register conventionally integrated in the DMA module. This approach reduces the space requirement of the DMA module, and the DMA module may be employed to control a large number of DMA processes that may mutually interrupt each other by providing a plurality of memory locations to store specifications of the DMA blocks.

11 Claims, 4 Drawing Sheets

DMA MODULE HAVING PLURALITY OF FIRST ADDRESSABLE LOCATIONS AND DETERMINING IF FIRST ADDRESSABLE LOCATIONS ARE ASSOCIATED WITH ORIGINATING DMA PROCESS

BACKGROUND OF THE INVENTION

The invention relates to the field of microcontrollers, and in particular to the field of direct memory access (DMA) devices.

DMA modules are employed in microcomputer controller systems and microcontroller systems to relieve the CPU from routinely recurring data transfer tasks. A DMA module may be viewed as a kind of specialized processor which receives a specification for a memory area which must be accessed, for example, a start address and stop address, or a start address and a number of subsequent memory locations, and which outputs the addresses of a specified range in rapid succession to an address bus to enable rapid reading from or writing to the memory area. A DMA module thus enables the rapid transfer of data between memory areas, or between one memory area and a peripheral device, without taking up any of the processing power of the CPU. A DMA module thus relieves the CPU from simple data transfer tasks, thereby increasing the average achievable performance of the CPU.

If the CPU and the DMA module share a common bus for access to the memory, then for every bus cycle in which the DMA module accesses the memory for a read or write operation the CPU must be halted to prevent the CPU from attempting to initiate access at the same time. Although during this procedure, known as "cycle stealing," the operation of the CPU is slightly diminished, the number of CPU cycles lost is significantly less than if the CPU itself had to control the data transfer. Hence, use of the DMA module enhances the performance of the CPU.

A DMA module always proceeds from a start address to a stop address. In the conventional approach, the two addresses are stored in internal registers of the DMA module. As a result, it is possible with a single bus cycle to output an address, to read or write a memory location identified by the address, and to advance an address counter for the following read or write operation.

A DMA module with two registers of this type is able to perform only one DMA process at a time. If a running DMA process has to be interrupted to perform a DMA process of higher priority, the register contents of the currently running, lower priority process with its current values from the DMA module must be swapped out and temporarily stored to allow the relevant parameters of the higher priority process to be loaded and executed. This swapping out and loading of addresses slows down the DMA module, and the microcontroller along with it, and is therefore not desirable.

A conceivable approach would be to equip a DMA module of this type with a plurality of register pairs that would hold the parameters of the different DMA processes. As a result, to interrupt a currently running DMA process in favor of a higher-priority process the system would switch to a different register pair.

The problem with this approach, however, is that registers of this type have a relatively large space requirement on a semiconductor substrate, this requirement typically being five times the requirement of a memory element of identical size within RAM. This large space requirement makes fabrication of multi-process DMA modules expensive.

Therefore, there is a need for a DMA module which has a relatively small space requirement, and a method of operating a DMA module in which such small-area DMA modules may be employed.

SUMMARY OF THE INVENTION

A DMA module includes an address generator to perform a write or read access to a memory location of an addressable memory, and an address counter to advance a stored address to an adjacent memory location. The address counter does not act on an internal register of the DMA module but instead is configured so that between reading an address value from the memory and writing the address value to the memory, the address counter is advanced once. As a result, the memory location of the memory at which the address value is read or written takes on the function of a register conventionally integrated in the DMA module. This approach reduces the space requirement of the DMA module, and yields the additional advantage that the DMA module may be employed to control a large number of DMA processes that may mutually interrupt each other, simply by providing a plurality of memory locations of the memory to store specifications of the DMA blocks.

Operation of the DMA module comprises the following steps:

a) Implementing a read access to a memory location identified by the first address so to read there a second address which points to the next memory location that is accessed in the current DMA process;

b) Advancing the second address to an adjacent memory location and storing the second address at the memory location identified by the first address, and c) Implementing a write access or read access at a memory location identified by the second address (although it is unimportant whether or not the second address is first advanced and the memory location identified by the second address is then accessed, or vice versa).

Since the parameters required to control the DMA process are present in the addressable memory and not within the DMA module itself, it is no longer necessary to first swap out register values to switch from one DMA process to another. As a result, relatively rapid switching is therefore possible between different DMA processes.

To have the DMA module determine when a DMA process has been completed, it is possible before write accessing and read accessing the memory location identified by the second address to read a count value that is representative of the number of memory access operations yet to be performed, to increment or decrement the count value, and then to re-store the count value after implementation of the write/read access to the second address as set forth in step c). In this way, the DMA module can determine from the count value when a DMA process has been completed, and terminate it at the correct time.

To reduce the number of memory access operations, it is useful to record this count value during each read access of step a) and to log the value during the write access of step b). This procedure may be implemented as long as the total bit number of the second address and of the count value do not exceed the width of data words read in a single data access, in other words, the width of the data bus. In this way, one bus cycle is sufficient to read or store the required parameters of one DMA process.

Another aspect of the invention involves the utilization of the normally frequently available interrupt request line of the peripheral module to transfer the DMA request signal by which a peripheral module requests a DMA transfer. To this end, the DMA module is advantageously looped into the request line to the interrupt controller, and is thus connected in series before the interrupt controller.

As a result, a design is created that is able to initiate a number of inexpensive (in terms of CPU performance) DMA transfers before an inexpensive interrupt of the CPU is initiated. A design of this type is particularly suitable for collecting data to process it at the end of the process in a concentrated way with CPU participation but without detectable CPU overloading.

In an aspect of the invention, a data table may be transferred under DMA control between a peripheral module and RAM, but nevertheless initiates a CPU interrupt routine at the end of the process. In the interrupt routine, the CPU is able to process, for example, the current data table in a time-concentrated manner, then configure the DMA module to transfer the next data table and start this DMA sequence.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
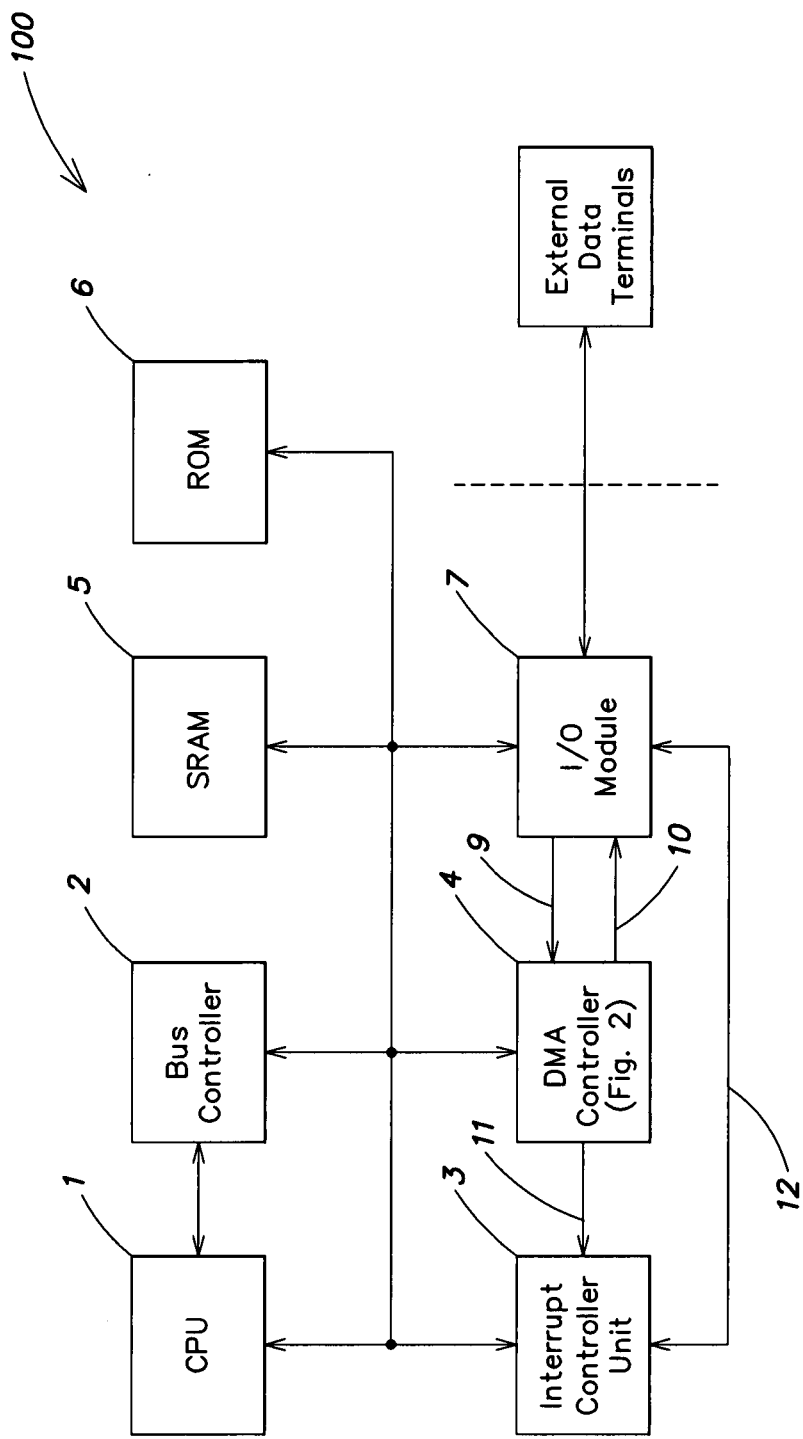
FIG. 1 is a block diagram illustration of a microcontroller system.

FIG. 1 is a block diagram illustration of a microcontroller system 100. The microcontroller system 100 comprises a CPU 1, a bus controller 2, an interrupt manager unit (interrupt controller unit ICU) 3, a DMA module or controller 4, a static read-write memory (SRAM) 5, a read-only memory (ROM) 6, and an input/output module 7. The components 1-7 are interconnected by an internal bus 8 with address lines, data lines and control lines. In addition, the I/O module 7 is connected to one or more external data terminals from which the module 7 receives data to store in internal bus 8, or to which terminals the module 7 outputs data from the internal bus 8. The I/O module 7, the DMA controller 4, and the ICU 3 are directly interconnected by a plurality of control lines 9-12 isolated from the bus 8. The design and function of the control lines 9-12 is discussed in more detail in connection with FIG. 2.

Figure 2:
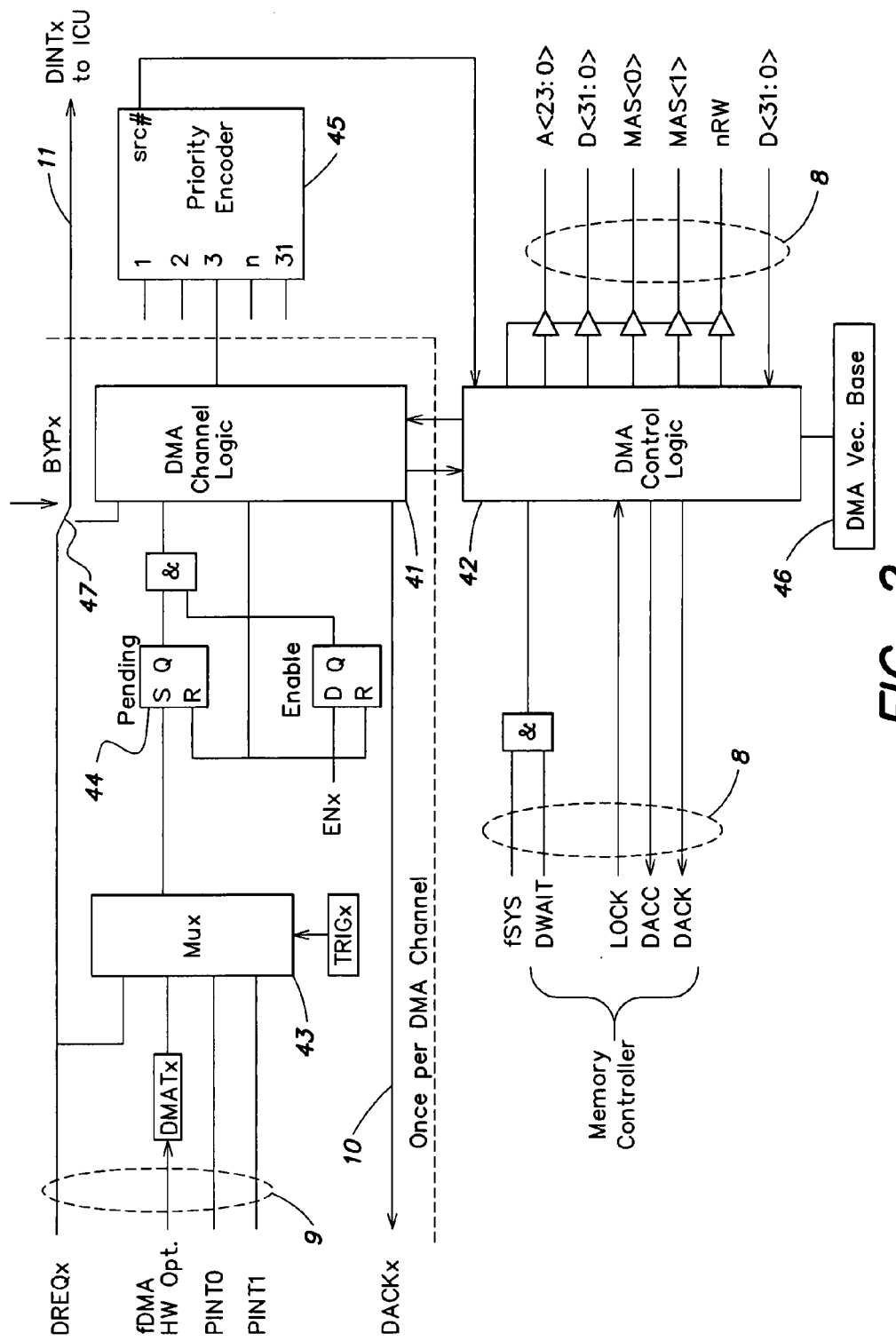
FIG. 2 is a block diagram of a DMA controller.

FIG. 2 shows in greater detail the design of the DMA controller 4. The functions of the DMA controller 4 may be subdivided into two areas, the first being the management of different processes that may initiate a DMA access, in this case various data sources or data sinks connected through the I/O module 7 to the microcontroller system 100, i.e., deciding for which of the various processes a DMA will be implemented at a given point in time. A second part of the DMA controller 4 is responsible for controlling the actual memory access. The management circuits of these two areas are designated as DMA channel logic 41 and DMA control logic 42. One DMA channel logic 41 is provided for each DMA channel, i.e., for each process that may be triggered for a DMA. An input multiplexer 43, to which the signals identifying the requesting process x (namely DREQx, x=1, 2, 3, 3, etc.) from the control line 9 are applied, sets a flag in an RS flip-flop 44 indicating the pending state of a DMA process. This flag is automatically reset by the DMA channel logic 41 if the corresponding DMA cycle has terminated. An enabling flag EN masks the pending state flag from a priority encoder 45. The priority encoder 45 is connected to outputs from all of the DMA channel logic circuits 41 and sends to its output an ordinal number corresponding to the channel logic circuit 41 with a pending DMA process having the highest priority level. The priority levels for the individual processes are recorded in the priority encoder 45. In addition, the DMA channel logic 41 sends an acknowledgment signal DACKx through the control line 10 back to the triggering process, which signal indicates implementation of a DMA access and communicates to the process that, depending on the access direction, a data value read from the memory 5 is located on the internal bus 8 and may be accepted, or that a data value supplied from the process has been accepted and a new value must be provided.

A switch 47 is located in the request signal line DREQX (where x=1, 2, 3) which allows a signal arriving on the line DREQx to be optionally fed through to the ICU 3, where it is able to trigger an interrupt, or to supply a control signal generated by the DMA channel logic 41 to the ICU 3. The function of the signal on the line 12 is to directly transfer data between the ICU 3 and the I/O module 7 in a situation in which the request signal DREQX is fed through at the switch 47 to the signal on the line 11.

Figure 3:
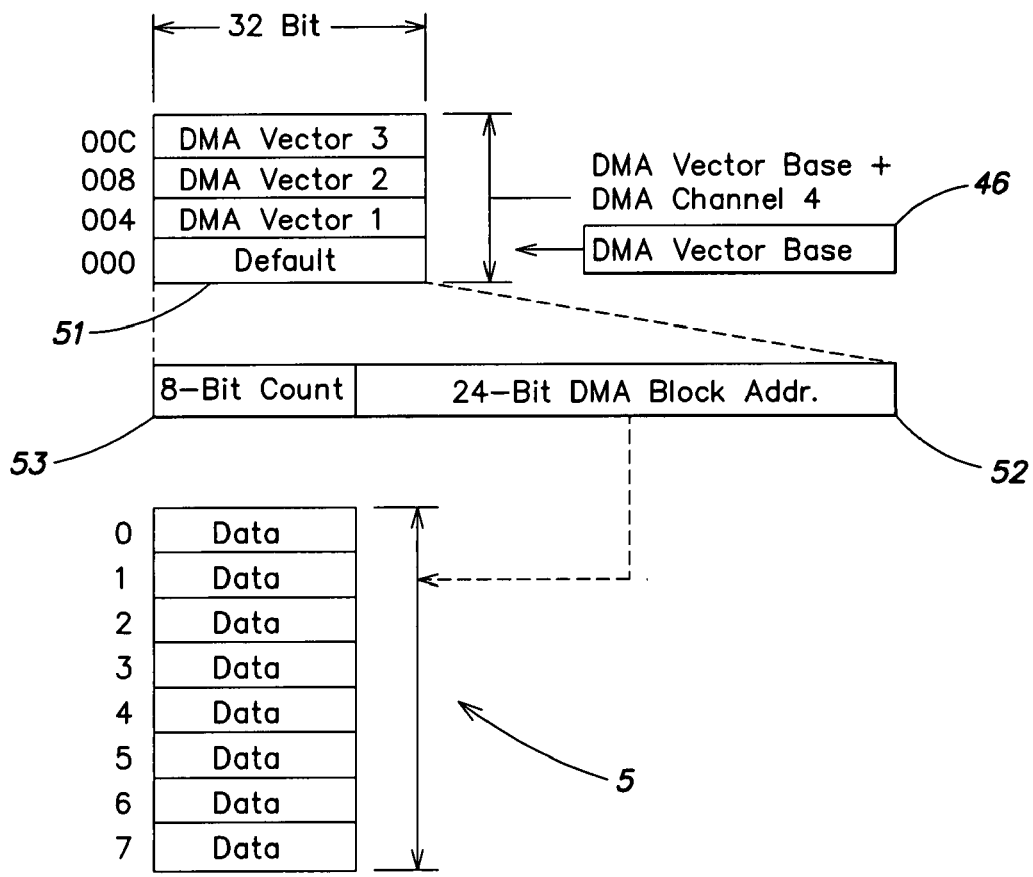
FIG. 3 illustrates a design of a DMA vector table.

Within one DMA cycle, the DMA control logic 42 controls the sequence of each individual access. To be able to manage the different DMA processes that may run in a time-overlapping fashion, the DMA control logic 42 accesses a DMA vector table 51 that is located in the SRAM 5. A start address for this vector table 51 is recorded in a table initial register 46 of the DMA control logic 42. The entries of the DMA vector table may be 32-bit words that form a specification for a DMA process and each may be composed, as illustrated in FIG. 3, of a 24-bit-wide address 52 that is the initial address of a block in the SRAM 5 in which a DMA access is to occur and of an 8-bit-wide count value 53 that indicates the length of the block in bytes.

Each time before a DMA process begins, the address and count value are each written to the DMA vector table 51, for example, by the CPU 1. Given the exemplary width of eight (8) bits for the count value, a DMA block may have a maximum length of $2^8=256$ bytes. However, any other types of apportionment for DMA vectors between the initial address and the count value, and thus other block lengths, are conceivable.

Whenever the DMA control logic 42 receives from the priority encoder 45 the number of a DMA process for which an access is to be implemented, the control logic 42 calculates an access address by adding the fourfold multiple of the number supplied by the priority encoder 45 to the address of the table initial register 46. If the number supplied by the priority encoder 45 assumes the values 1, 2 or 3, then the control logic 42 is able to access the fields of the vector table 51 identified in FIG. 3 as "DMA Vector 1", "DMA Vector 2", and "DMA Vector 3".

The DMA controller 4 is adaptable to manage varying numbers of DMA processes without significant modifications to its circuit design. The limiting factor for the number of processes is simply the output width of the priority encoder 45, i.e., the bit number of the line through which the encoder 45 transmits the number of a DMA-triggering process to the control logic 42, and the size of the DMA vector table 51.

Figure 4:
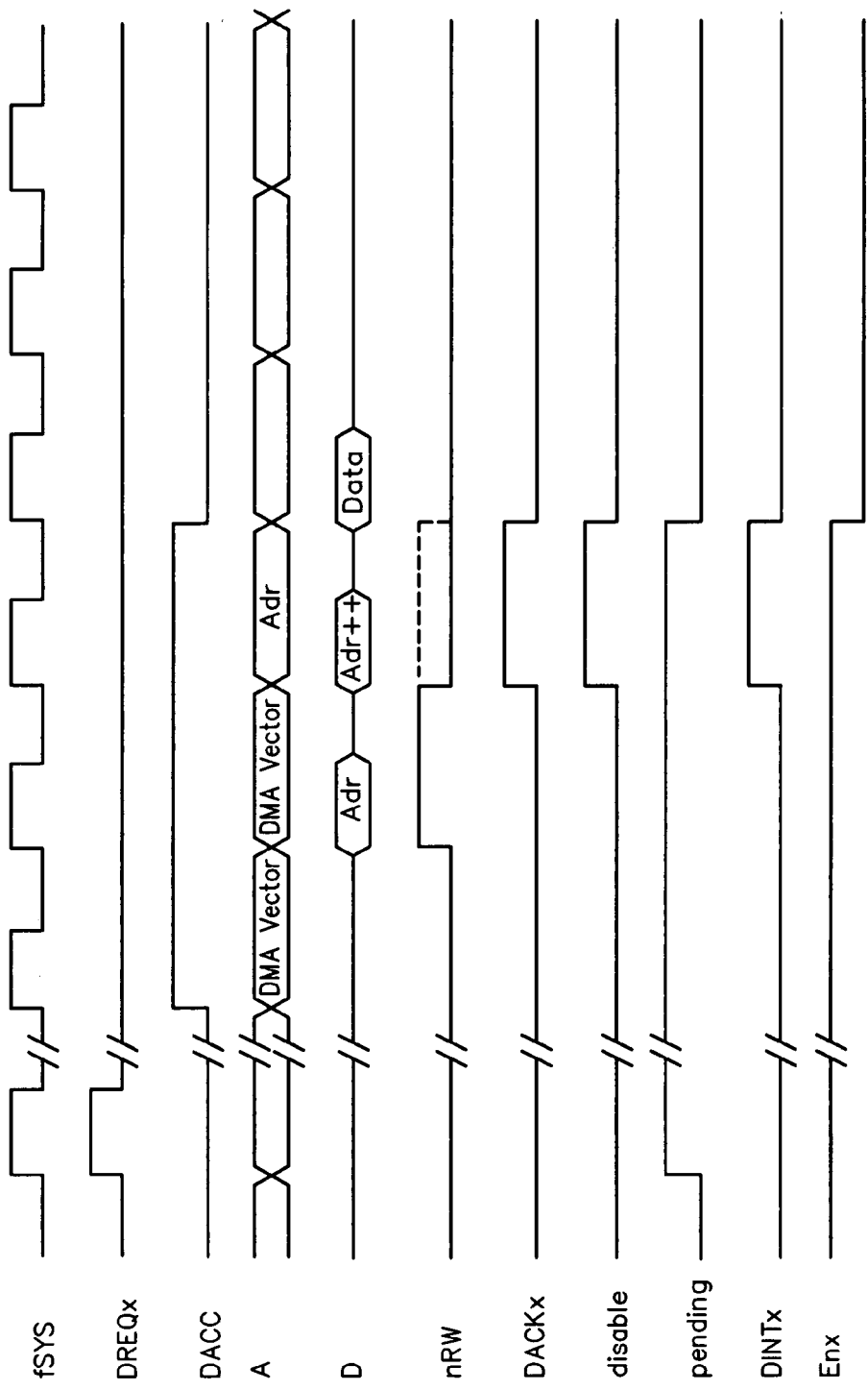
FIG. 4 is a timing diagram of various signals occurring in the DMA controller of FIG. 2.

FIG. 4 illustrates the behavior of different signals within the microcontroller system 100 over the course of a DMA process. Here $f_{sys}$ designates the system clock at which both the CPU 1 and the DMA controller 4 operate. A period of $f_{sys}$ corresponds to one CPU clock cycle. A pulse of the signal DREQx (x=1, 2, 3, etc.) indicates a DMA request by the process x. Several cycles may elapse before the request is fulfilled. When this happens, the signal DACC supplied by the DMA controller 4 to the memory control changes from low to high level to indicate that the DMA controller 4 has control of the bus 8 and that the CPU 1 may not access the bus 8 with either a write or a read operation. In a first clock cycle with DACC at high level, the DMA controller 4 uses the identity of the requesting process and the address recorded in the table initial register 46 to pass the address of one of the vectors "DMA Vector 1", "DMA Vector 2" or "DMA Vector 3" to address lines A of the bus 8. The SRAM 5, in which the table 51 of vectors is located, then sets the specification for a DMA block, recorded at the corresponding address and including the initial address and byte number to be sent, to the data lines of the bus 8. These values are transferred by the DMA controller 4 into an address register or a counter.

In the next clock cycle, the address of the DMA vector is again set to the address lines of the bus 8. At the same time, the initial address incremented by one and the count value decremented by one are passed to the data lines of the bus 8 where the previous DMA vector is overwritten by these values. In the following clock cycle, the incremented address is output to the address lines to, depending on the access direction of the DMA process, implement a write or read access at the corresponding memory location.

Whenever multiple write access and read access operations of a single DMA process follow in immediate succession, i.e., without interruption by a DMA process of higher priority, the step of reading the DMA vector may be eliminated for the second, and all subsequent, memory access operations since the specification stored there has already been stored in the registers of the DMA module 4. The memory locations identified by the DMA vectors thus have the function of registers that point to an address immediately before that memory address in the SRAM 5 at which the next write/read access is to take place. In other words, no access occurs at the actual address written to a DMA vector upon initialization of a DMA process but only at the subsequent addresses. Once the count value zero (0) is reached, the DMA process is terminated.

An alternative approach may be one in which, upon initialization of a DMA process at the memory location to which the assigned DMA vector must point, the size of the memory block to be processed and the first address are recorded at which a write or read operation is to be implemented. In this case, the sequence of steps described above in reference to FIG. 4 would be slightly modified. Immediately after reading the memory location identified by the DMA vector, the write/read access to the address indicated there may follow, then an incremented address and a decremented count value may be stored at a location identified by the DMA vector in a subsequent clock cycle.

In either case, the DMA process requires three clock cycles in which the CPU 1 is halted to read or write a first memory location, and at least two clock cycles for each of the following memory locations. Although this operation is slower than in a DMA in which the addresses of the memory block to be processed are stored directly in registers of a DMA controller 4 and do not have to be obtained from a swap-out memory, it is nevertheless significantly faster than if the CPU 1 itself has to perform these tasks. Since the number of registers required in the DMA controller 4 is independent of the number of DMA processes that the DMA controller 4 is able to process simultaneously, the invention makes it relatively easy to design a DMA controller which is able to handle any desirable large number of DMA processes simultaneously.

Although the present invention has been shown and described with respect to several preferred embodiments thereof, various changes, omissions and additions to the form and detail thereof, may be made therein, without departing from the spirit and scope of the invention.

What is claimed is:

1. A DMA module, comprising:
an address generator that implements an access to one of a plurality of first addressable locations each uniquely associated with different DMA processes, where each of the first addressable memory locations is within an addressable memory connected to the address generator via a bus, where the address generator comprises a register that contains an address value indicative of a starting address of a DMA vector table located in the addressable memory, where each of the plurality of first addressable locations located within the DMA vector table includes (i) a uniquely associated DMA block starting address and (ii) a count value indicative of the length of the DMA block from the uniquely associated DMA block starting address; and
means for receiving a DMA request, for determining the originating DMA process associated with the DMA request and for providing an originating DMA process signal indicative thereof;
where the address generator receives the originating DMA process signal and determines which of the plurality of first addressable locations is associated with the originating DMA process, and initiates DMA access to the DMA block starting address associated with the first address location associated with the originating DMA process.

2. The DMA module of claim 1, where access to a memory location of the addressable memory is a read access.

3. The DMA module of claim 1, where access to a memory location of the addressable memory is a write access.

4. The DMA module of claim 1, where the address value within the first addressable location associated with the originating DMA process is incremented each time the associated DMA block is accessed.

5. The DMA module of claim 1, where the address value within the first addressable location associated with the originating DMA process is decremented each time the associated DMA block is accessed.

6. The DMA module of claim 1, where the address counter stores its count value after one of the plurality of additional addressable locations is read from or written to.

7. The DMA module of claim 1, where the means for receiving a DMA request comprises a priority encoder that prioritizes DMA requests from a plurality of peripheral devices.

8. The DMA module of claim 7, where the means for receiving a DMA request is responsive to the highest priority request.

9. The DMA module of claim 1, further comprising a priority encoder that prioritizes requests from a plurality of peripheral devices for access to at least one of the plurality of additional addressable locations of the addressable memory and that provides the request of the highest priority at any point in time to the address generator, and where the address generator is responsive to the highest priority request to implement the access to a particular one of the plurality of first addressable location of the addressable memory.

10. The DMA module of claim 9, where the address generator stores an initial one of the plurality of first addressable locations of the vector table in a register, where the address generator calculates a value of the vector table by multiplying a number associated with the highest priority request provided by the priority encoder by a predetermined multiplier and adding the multiplied value to the initial one of the plurality of first addressable locations of the vector table stored in the register, and where the calculated value of the vector table represents a selected one of the plurality of first addressable locations in the addressable memory.

11. A system for DMA access, comprising:

address generating means for implementing an access to one of a plurality of first addressable locations each uniquely associated with different DMA processes, where each of the first addressable memory locations is within an addressable memory connected to the address generator via a bus, where the address generator comprises a register that contains an address value indicative of a starting address of a DMA vector table located in the addressable memory, where each of the plurality of first addressable locations located within the DMA vector table includes (i) a uniquely associated DMA block starting address and (ii) a count value indicative of the length of the DMA block from the uniquely associated DMA block starting address; and means for receiving a DMA request, for determining the originating DMA process associated with the DMA request and for providing an originating DMA process signal indicative thereof;

where the address generator means receives the originating DMA process signal and determines which of the plurality of first addressable locations is associated with the originating DMA process, and initiates DMA access to the DMA block starting address associated with the first address location associated with the originating DMA process.

* * * * *

UNITED STATES PATENT AND TRADEMARK OFFICE
CERTIFICATE OF CORRECTION

PATENT NO. : 7,293,120 B2  Page 1 of 1
APPLICATION NO. : 10/751668
DATED : November 6, 2007
INVENTOR(S) : Burkhard Giebel It is certified that error appears in the above-identified patent and that said Letters Patent is hereby corrected as shown below:

Column 4
line 19, delete "DREQX" and insert --$DREQ_X$--
line 26, delete "DREQX" and insert --$DREQ_X$--

Column 6
line 5, after "controller" insert --4--

Signed and Sealed this

Eleventh Day of March, 2008

JON W. DUDAS
*Director of the United States Patent and Trademark Office*